United States Patent
Wardropper et al.

(10) Patent No.: US 10,337,540 B2
(45) Date of Patent: Jul. 2, 2019

(54) ANTI-OSCILLATION APPARATUS AND TECHNIQUE FOR SECURING WIND TURBINE BLADES AGAINST OSCILLATIONS

(71) Applicant: Vestas Wind Systems A/S, Aarhus N. (DK)

(72) Inventors: Steve Wardropper, New Milton (GB); Adrian Edwards, Gurnard (GB); Arran Wood, Cowes (GB)

(73) Assignee: Vestas Wind Systems A/S, Aarhus N. (DK)

( * ) Notice: Subject to any disclaimer, the term of this patent is extended or adjusted under 35 U.S.C. 154(b) by 152 days.

(21) Appl. No.: 15/540,273

(22) PCT Filed: Dec. 3, 2015

(86) PCT No.: PCT/DK2015/050379
§ 371 (c)(1),
(2) Date: Jun. 28, 2017

(87) PCT Pub. No.: WO2016/107624
PCT Pub. Date: Jul. 7, 2016

(65) Prior Publication Data
US 2017/0370386 A1 Dec. 28, 2017

(30) Foreign Application Priority Data
Dec. 29, 2014 (DK) .................................. 2014 70831

(51) Int. Cl.
*F15D 1/10* (2006.01)
*F03D 80/00* (2016.01)
(Continued)

(52) U.S. Cl.
CPC .............. *F15D 1/10* (2013.01); *F03D 1/0675* (2013.01); *F03D 80/00* (2016.05); *F03D 80/50* (2016.05);
(Continued)

(58) Field of Classification Search
CPC .......... F15D 1/10; F03D 1/0675; F03D 80/50; F03D 80/00; F05B 2240/14;
(Continued)

(56) References Cited

U.S. PATENT DOCUMENTS

2008/0282590 A1   11/2008   Wobben
2009/0074585 A1*   3/2009   Koegler ............... F03D 1/0675
                                                                416/228
(Continued)

FOREIGN PATENT DOCUMENTS

DE   202004016460 U1   12/2004
EP        2507513 A1   10/2012
(Continued)

OTHER PUBLICATIONS

Danish Patent and Trademark Office, Examination Report in PA 2014 70831, dated Jul. 9, 2015.
(Continued)

*Primary Examiner* — Hung Q Nguyen
(74) *Attorney, Agent, or Firm* — Wood Herron & Evans LLP (57) ABSTRACT

The invention relates to a wind turbine blade oscillation preventer comprising an aperture and a sleeve and having a peripheral extent and a longitudinal extent, the preventer being configured for removable application over a wind turbine blade and configured to extend longitudinally thereover and peripherally thereabout; the preventer having a non-aerodynamic exterior surface which exhibits a rough surface capable of disrupting smooth or laminar airflow over
(Continued)

a substantial portion of the longitudinal and peripheral extent of the sleeve when the preventer is in place on a wind turbine blade. The preventer further comprises a smooth interior surface extending along a substantial portion of the longitudinal extent of the sleeve. The invention also relates to a method of application of a blade oscillation preventer over wind turbine blades which comprise serrations at a trailing edge thereof.

16 Claims, 6 Drawing Sheets

(51) Int. Cl.
  *F03D 80/50*  (2016.01)
  *F03D 1/06*  (2006.01)
(52) U.S. Cl.
  CPC ....... *F05B 2230/60* (2013.01); *F05B 2230/70* (2013.01); *F05B 2240/14* (2013.01); *F05B 2240/211* (2013.01); *F05B 2240/912* (2013.01); *F05B 2250/62* (2013.01); *F05B 2260/96* (2013.01); *Y02B 10/30* (2013.01); *Y02E 10/721* (2013.01); *Y02E 10/726* (2013.01); *Y02E 10/728* (2013.01); *Y02P 70/523* (2015.11)

(58) Field of Classification Search
  CPC .............. F05B 2230/60; F05B 2230/70; F05B 2240/211; F05B 2240/912; F05B 2260/96; F05B 2250/62; Y02E 10/721; Y02E 10/728; Y02E 10/726; Y02P 70/523; Y02B 10/30
  See application file for complete search history.

(56) References Cited

U.S. PATENT DOCUMENTS

2010/0135814 A1 6/2010 Bakhuis et al.
2012/0301293 A1 11/2012 Bech

FOREIGN PATENT DOCUMENTS

JP  2006291943 A 10/2006
WO  2011067304 A1 6/2011

OTHER PUBLICATIONS

European Patent Office, International Search Report and Written Opinion in PCT/DK2015/050379, dated Feb. 25, 2016.

* cited by examiner

ANTI-OSCILLATION APPARATUS AND TECHNIQUE FOR SECURING WIND TURBINE BLADES AGAINST OSCILLATIONS

This invention relates to an anti-oscillation apparatus and to technique for securing wind turbine blades against oscillations.

Figure 7:
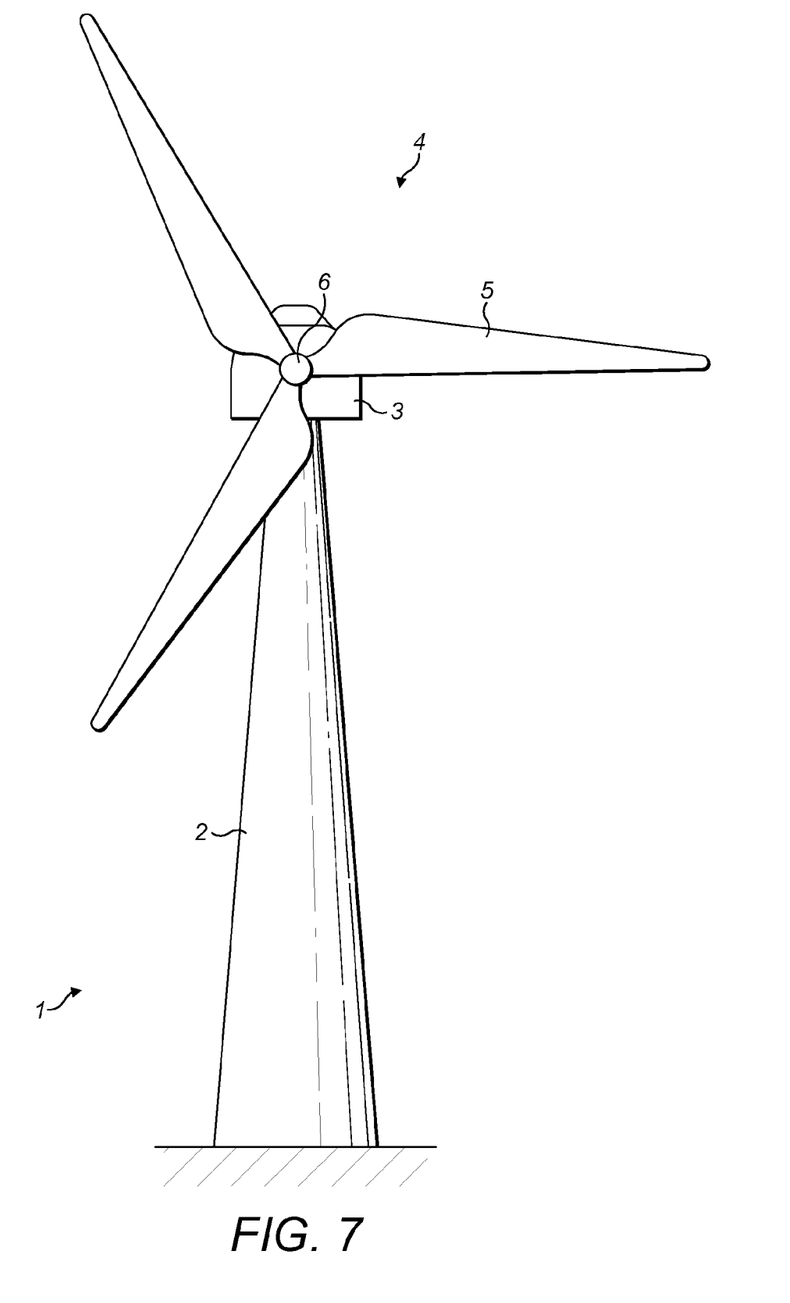
FIG. 7 shows a schematic illustration of a wind turbine.

A typical horizontal axis wind turbine is illustrated in FIG. 7 to which reference should now be made. FIG. 7 illustrates a wind turbine 1, comprising a wind turbine tower 2 on which a wind turbine nacelle 3 is mounted. A wind turbine rotor 4 comprising at least one wind turbine blade 5 is mounted on a rotor hub 6.

The hub 6 is connected to the nacelle 3 through a shaft (not shown) extending from the nacelle front. The nacelle 3 can be turned, using a yaw drive positioned at the top of the tower 1, to change the direction in which the rotor blade hub 6 and the blades 5 are facing. The blades are aerodynamically profiled so that they experience a 'lift' or pressure from the wind as the wind flows past the surface of the blade. The angle or pitch at which the leading surface of the blade aerodynamic profile meets the incident wind can be altered using a pitch drive, which turns the blades 5 with respect to the hub 6.

Figure 1:
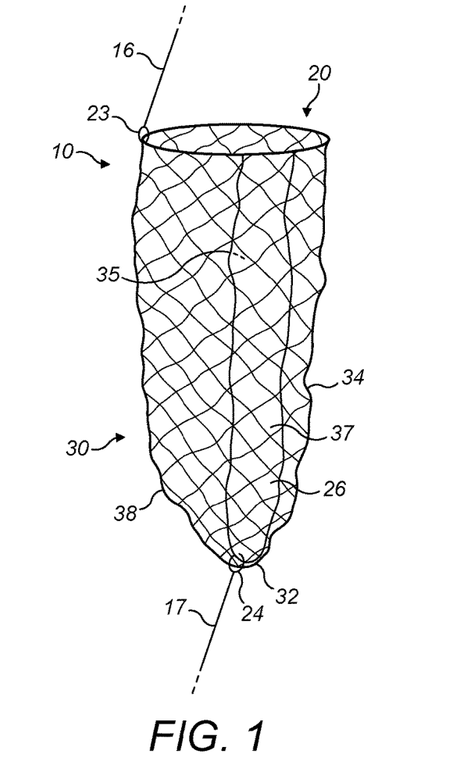
FIG. 1 shows an orthogonal figurative view of an example of an oscillation preventer for a wind turbine blade according to aspects of the invention.

The wind turbine illustrated in FIG. 1 may be a small model intended for domestic or light utility usage, or may be a large model, such as those that are suitable for use in large scale electricity generation on a wind farm for example. A typical commercial wind turbine, for example one that is designed to generate say 3 MW of power, can stand approximately 100 meters high and have wind turbine blades with a length of around 40 m or more. The size of the wind turbine blade, and in particular the area that is swept out by the blades as they turn in the wind is linked to the amount of energy the turbine can extract from the wind. In commercial energy generation wind turbines are therefore large so that they provide the greatest generation capacity.

In normal operation such as during power generation, the yaw drive turns the nacelle 3 so that it points the rotor hub 6 into the wind and the pitch drive adjusts the blades 5 of the wind turbine so that they are positioned with an angle of attack which creates lift and causes the rotor 4 to turn. The pitch of the blades can then be adjusted so that they force they experience from the wind is maintained within safe operating parameters, while generating as much energy from the incident wind as possible.

When the wind turbine is not generating power, such as before connection to the grid or during times of maintenance, the blades of the turbine are to as great an extent as possible turned out of the wind by means of the yaw drive and pitch drives so that the blades do not experience much force from the incident wind. This position of the blades is known as a "feathered" position. In this position, the wind turbine blades may be brought to a standstill and may optionally be locked. When the wind turbine blades are feathered with respect to the wind, then the wind flows around the blades smoothly, but without generating lift. This condition can be maintained when the wind direction changes by adjusting the yaw angle of the nacelle to maintain, as much as possible, an approximate alignment between the blade chordwise direction and the wind direction, or—expressed differently—to maintain an angle of attack between the blades and the wind direction which is neutral, that is to say, which generates substantially no lift.

In certain situations, it is necessary to shut off all power to a wind turbine's adjustment drive mechanisms. Without power to continuously adjust the rotor yaw or blade pitch, it may be temporarily impossible to maintain a feathered aspect of the wind turbine blades in relation to the wind in situations in which the wind direction changes. This can result in a situation in which the flow of air around the blades is wholly or partly from one side. This can lead to more or less turbulent i.e. non-smooth airflow around the blades. This occurs in particular when the incident wind meets the blade more or less perpendicular to one of its major surfaces and has to flow around the leading and trailing edges of the blade. It is thought that this can lead to a phenomenon known as vortex shedding in which vortices are alternately shed downwind from opposing sides of a fixed elongate structure. This leads to oscillations of the structure from side to side in synchronisation with the shedding of respective vortices downwind. The phenomenon can be pronounced, especially so when the oscillation frequency chimes with the natural frequency of the relevant structure, in which case the amplitude of the oscillations becomes so large as to be potentially destructive.

In the case of wind turbine blades, a similar tendency is thought to be caused by the largely unstable flow of air around the rotor blade, particularly the leading edge, when the blade is fixed and pitched at a transverse angle to the wind. The air flows around the curved surface of the blade, but cannot stay attached to the blade surface in laminar flow because of the blade is not pitched correctly to support lift. As a result, a laminar air flow may briefly occur but is then lost, resulting in the formation of a vortex in the flow on the leeward side of the blade. This situation is often referred to as a vortex shedding flow, and it has the characteristic that the separations in the air tend to shift from one side of the blade to the other in a rhythmic air flow. These oscillations are typically experienced first at the tip of the blade, where the reduced diameter and lighter frame offer less resistance to the rhythmic shifting force provided by the air. If the rhythmic oscillation provided by the air flow corresponds to the resonance frequency of the blade itself, the blade can eventually suffer a potentially catastrophic failure.

Thus, it can be appreciated that when the blades of the wind turbine are locked and at a standstill, and with no power to the turbine's systems, they are prone to edgewise oscillations (edgewise is the direction from the leading edge to the trailing edge of the blade, i.e. in the direction of a chord of the blade) resulting from the air flow across or around the blade, when the wind hits the blade from the side. Consequently, and if the oscillations are of a large enough magnitude—notwithstanding the blade construction's exceptional resilience and strength—the edgewise oscillations can result in physical damage to the structure of wind turbine blades which may be costly and time consuming to repair.

For this reason, many wind turbines comprise mechanical or hydraulic devices that dampen oscillations induced in the wind turbine blade before they can develop a magnitude that is sufficient to damage the blade. Although, such devices do solve the problem, they can be expensive and difficult to install. It has therefore been appreciated that there is a need for an apparatus and method for addressing such oscillations in the blade.

It has been suggested, in WO2011/067304, to apply a releasably attachable temporary blade cover to a wind turbine blade to provide a non-aerodynamic outer surface for inducing turbulence in the air flow across the blade. In particular, it has been suggested to apply a blade cover in the form of a textured sleeve such as a net-like sleeve. This device has been found to be very effective in preventing edgewise oscillations of the blades when the rotor is at a standstill, possibly by interrupting any vortex-shedding type effect around the blade.

A feature of normal wind turbine operation is a certain level of noise produced from the rotation of its rotors. This is thought to be caused by the airflow past the blades' trailing edge as they move more or less rapidly through the air. It has been found that the noise level generated by any given airflow across a blade during operation thereof can be effectively reduced by application of serrations to the blade trailing edge. These may in particular be applied to the tip regions of wind turbine blades.

The presence of serrations at a blade trailing edge and especially in tip regions thereof has been found to interfere with the expedient application of an anti-oscillation sleeve to the blade prior to turbine or rotor installation or maintenance or at any time when an anti-oscillation sleeve may be required to be put on a blade. Removal of such a sleeve may also be made more difficult.

SUMMARY OF THE INVENTION

In a first aspect, the invention provides an oscillation preventer for a wind turbine blade. The preventer comprises an aperture and a sleeve and has a peripheral extent and a longitudinal extent. The preventer is configured for removable application over a wind turbine blade and in particular to extend longitudinally thereover, i.e. over all or part of the blade, in particular over at least a tip region of a wind turbine blade. The preventer is furthermore configured to extend peripherally about all or part of a blade, in particular about at least a tip region of a wind turbine blade and within the longitudinal extent of the blade covered by the preventer. The preventer sleeve has a non-aerodynamic exterior surface which exhibits a rough surface capable of disrupting smooth or laminar airflow over a substantial portion of said longitudinal and peripheral extent of the sleeve when the preventer is in place on a wind turbine blade. For the purposes of the present disclosure, the term "non-aerodynamic" may be understood as or synonymous with "turbulence-inducing". The preventer further comprises a smooth interior surface extending along a substantial portion or substantially all of the longitudinal extent of said sleeve. In particular, the smooth interior surface may extend along a substantial portion of the longitudinal extent of the sleeve and along a portion of the peripheral extent of the sleeve. A substantial portion in this context may denote an amount between all of the relevant dimensional extent and at least two thirds of the relevant dimensional extent. Most particularly, the non-aerodynamic exterior surface should extend over a sufficient extent of the preventer to effectively disrupt smooth or laminar airflow across or about the preventer when it is in position on a blade. The smooth internal surface should extend along a sufficient longitudinal length of the preventer to thereby ensure that the smooth internal surface comes into contact with the trailing edge of the blade in preference to the aforementioned non-aerodynamic external surface when the preventer is in position on a blade. In aspects of the invention, the smooth interior surface may extend along substantially the full longitudinal extent of the preventer sleeve. The sleeve comprises an aperture portion which coincides with the aperture of the preventer. The oscillation preventer of the invention is defined in appended claim 1. Further optional aspects thereof are defined in appended subclaims 2-11.

In use, the smooth interior surface ensures that the blade trailing edge is shielded from contact with the rough non-aerodynamic external surface of the preventer. This ensures that the preventer can be applied to wind turbine blades which exhibit serrations at their trailing edge. In particular, the smooth internal surface prevents snagging between the rough non-aerodynamic external surface and the serrations. The smooth internal surface glides over the serrations without engaging them and without damage either to the serration or to the smooth internal fabric.

In a preferred, optional aspect, the smooth interior surface may be formed wholly or in a substantial part thereof from an abrasion resistant, low-friction material. A low-friction material may be any material such as a planar material with substantially no bumps or recesses and which presents no surface features capable of being an attachment or snagging point. It may in particular be smooth material such as a film material or a fabric material having a tightly woven surface. Preferably the material will have a relatively high degree of stiffness with a tendency to resist folding or rucking during handling or use. Abrasion resistance may be characterised by high toughness of the constituent materials.

In a further optional aspect, the smooth interior surface may be formed wholly or in a substantial part thereof from a material comprising a plain fabric or a plain film. A plain sailcloth may be suitable. In particular a mainsail or headsail sailcloth may be most appropriate. In this context, the term "plain" denotes a planar or substantially planar material layer. In aspects, the smooth interior surface material may comprise wholly or in a substantial part thereof a material selected from PET, polyester, UHMWPE or blends of these materials with other materials. A suitable UHMWPE material may include Spectra™. Optionally a UHMWPE may be employed in a minority proportion. A suitable film material may be a PET film such as Mylar™. A suitable polyester material in particular for a smooth, tough, low-friction and high abrasion resistance fabric may be Dacron™ or IW70™. Fabric may preferably be woven. A typical canvas type weave or other plain weave may be preferred. A plain weave with advantageous surface characteristics such as low-friction and high abrasion resistance may in particular be a so-called taffeta type weave. Another suitable type of plain weave, allowing a higher weight per square centimeter than taffeta and possibly exhibiting greater stiffness may be a so-called fill-oriented weave, in which the warp yarns are woven over and under the weft (or fill) yarns. In this construction, the weft yarns run generally straight across and through the fabric while the warp yards run in a wavy path along and through the fabric. In this construction, stretch in the weft direction is minimized and the fabric may acquire a greater thickness than in a canvas or taffeta type weave. In general, any suitable weave pattern may be employed which exhibits high abrasion resistance and a certain smoothness in its surface. Other types of weave than plain weave may provide suitable characteristics such as for example twill or satin or basket weave patterns. In general, it is intended that the smooth internal surface material be planar and non-textured, that is to say substantially free of surface features such as bumps or troughs or undulations. In particular, any repeating surface texture of the smooth internal surface should be on a scale considerably smaller than the scale of the separation between serrations at a wind turbine blade trailing edge, the scale of which is typically around a centimeter or larger between adjacent peaks. Hence, a surface texture arising for example from a weave pattern should be of the order of millimeters, preferably two millimeters or smaller, preferably one millimeter or smaller. Hence, in a further optional aspect, the smooth inner surface may have a surface texture which exhibits undulations of less than 2 mm in amplitude, preferably not more than 1 mm in amplitude from peak to trough, measured in relation to a principal plane of the material.

In a further optional aspect, the smooth interior surface may extend from an aperture portion of the sleeve and internally within it. Preferably, the smooth interior surface may extend along at least a longitudinally extending segment of the peripheral extent of the preventer. In embodiments, the smooth interior surface may be generally tongue-shaped, preferably extending from the aperture to the distal end of the interior of the sleeve.

In embodiments, the non-aerodynamic surface may be formed in whole or in a substantial part thereof from a net-like or bumpy or heavily textured material. In embodiments, the preventer sleeve may preferably be elongate in shape extending from an aperture region at its proximal end to a closed region at its distal end. The smooth interior surface may optionally constitute a tongue-shaped segment of the sleeve either positioned wholly within the exterior surface or contiguous with the exterior non-aerodynamic surface. Hence, in effect, in embodiments, the exterior non-aerodynamic surface may be partially interrupted by a tongue-shaped insert in the form of a smooth interior surface material.

In further optional aspects, the non-aerodynamic exterior surface may be an external surface of a first, outer layer of the sleeve while the smooth interior surface may be an internal surface of a second, inner layer of the sleeve. The sleeve may thereby comprise a first, outer non-aerodynamic layer a second, inner, smooth layer. In particular, respective first and second layers may extend from the aperture region of the preventer. In this way, a first, exterior and a second, interior layer of a sleeve of the preventer may be substantially coextensive in the longitudinal extent of the sleeve. The second, inner layer may extend about all or part of the inner peripheral extent of the preventer or its sleeve. In one aspect, the smooth, interior layer may be tongue-shaped. In a further aspect, the smooth, interior layer may be sock-shaped. Hence, in still further optional aspects, the smooth interior surface may be provided in the form of a full or partial lining inside the sleeve and extending from the aperture region thereof, preferably to a distal end thereof. The lining may extend inside substantially the full longitudinal and peripheral extent of the preventer. Optionally, the non-aerodynamic exterior surface may extend over substantially the full longitudinal extent of the sleeve and around a majority of the peripheral extent of the sleeve.

In a further aspect, the preventer of the invention may advantageously comprise a resilient collar at or around said aperture thereof. The collar may preferably be made of a resilient material. Preferably, the collar material may comprise a plastics material, wholly or in a major part thereof. Preferably, the collar is made from a tenacious material. In embodiments, the preventer collar may be made from a resilient, flexible foamed material. Preferably, the collar has a low friction surface which may be a surface coating. In optional aspects, the preventer collar may have a frustoconical shape which may be a generally funnel shape, especially a shallow funnel shape. In still further aspects, the preventer collar may be generally circular or generally elliptical. In aspects the collar is capable of holding open the preventer sleeve aperture region. In optional embodiments, the collar may be inflatable, preferably in the form of an inflatable doughnut-shaped element. Its rigidity may be derived from a high inflation pressure. Smoothness or low-friction surface characteristics of an inflatable collar may derive from a polymer material or polymer coating of the inflatable collar.

In particular, a film type material may be selected for an inflatable collar. Advantageously, the collar facilitates applying the preventer to a wind turbine blade. Preferably, the collar allows the preventer aperture and the portion of the external non-aerodynamic surface lying adjacent the aperture to ride over serrations at a blade trailing edge, allowing the preventer to be easily applied. With the cross section of a wind turbine blade being typically shaped in the form of an elongate ellipse or very elongate ellipse, or flattened teardrop shape, it is thought that a generally elliptical shaped collar will provide the most effective shape for application or removal of the preventer. In some embodiments, it may be advantageous to suspend the material of the external non-aerodynamic surface and the material of the smooth internal surface directly from the collar using an appropriate mounting or fixing interface between the relevant material and the collar. Thus, the rough exterior surface and smooth interior surface may preferably both extend longitudinally from said aperture. This will ensure both a seamless transition between the collar and the smooth internal surface as well as an effective threading of the non-aerodynamic external surface over the blade tip.

In still further aspects of the invention, the preventer may comprise a first line extending from an aperture region thereof, which may be a guide line. Preferably, the guide line may be fixed to or removably attached to the preventer, in particular to a collar or to an element constructionally associated with a collar. The guide line may facilitate the application of the preventer over a blade tip in ways which are discussed in more detail later in this specification. In particular, the guide line may be fixable at an end remote from the preventer to another part of a wind turbine such as a tower, nacelle or rotor.

In a further optional aspect, the preventer may further comprise a second line, which may be a tripping line, extending from a distal portion of the smooth interior surface of the preventer. The tripping line may preferably be fixed to or removably attached to the smooth interior surface or to an element constructionally associated with it. The tripping line may assist with the release of the preventer upon removal thereof from the blade. The tripping line may be used in order to counteract any tendency for the smooth interior surface material, after having been in place on a blade tip for possibly some time, to shape itself to any extent around one or more serrations on the blade tip trailing edge. A tug on the tripping line, perhaps while initially restraining the guide line prior to releasing it for removal of the preventer, may serve to straighten out any deformations of the smooth interior surface allowing easy, controlled disengagement of the smooth surface from the blade trailing edge or any serrations thereat and easy removal thereof from the blade tip. In aspects, the tripping line or second line may serve as a distal end guide line during application or removal of the preventer.

In a further aspect, the invention resides in a method of operating a wind turbine to inhibit oscillations induced by the air flow across the blades when the wind turbine is in a non-operational mode, wherein the blades include serrations at a trailing edge and in a tip region. The inventive method comprises the steps of releasably locking the wind turbine blades of its rotor in place and applying and releasably securing a preventer according to the present invention to a wind turbine blade so that the preventer covers a region of the blade surface and provides a non-aerodynamic outer surface capable of inducing turbulence in the air flow across said blade. The method includes in particular disposing the smooth interior surface of the preventer sleeve over and about the serrated trailing edge of the blade during application and securing of the preventer.

In a further aspect, the method may further include attaching a first guide line to an attachment point on the preventer adjacent its aperture and pulling the sleeve onto a wind turbine blade by means of the first guide line. Thereafter, the first guide line may be tied or fixed to a part of the wind turbine to secure the sleeve in place on the blade.

In a still further aspect, the method may further include attaching a second line to a distal end of the preventer, so that pulling simultaneously on said first and second lines pulls the length of said sleeve taut. The second line may in particular be a tripping line and may be connected to a distal end of said smooth internal surface material. In a further aspect, the method may include pulling on said second line in order to free said smooth interior surface from said serrations prior to removal of said preventer. Preferably the second line may be pulled simultaneously with the first line. Preferably, the second line is a tripping line. The second line or tripping line may in particular be attached to the material of the smooth inner surface in such a manner that a pulling action on the second line while restraining the preventer against the pulling action—e.g. by pulling simultaneously on the first line—tends to pull the preventer sleeve taut and at the same time also pull the material of the smooth interior surface taut. The method of the invention is defined in appended claim 12. Further optional features thereof are defined in subclaims 13-15.

BRIEF DESCRIPTION OF THE DRAWINGS

The invention will now be described in more detail, and by way of example, with reference to the not-to-scale figurative drawings, in which.

DETAILED DESCRIPTION OF THE PREFERRED EMBODIMENTS

The construction of one example of an oscillation preventer 10 is shown in more detail in FIG. 1. The preventer 10 comprises a non-aerodynamic exterior surface 34 of a substantially net-like or otherwise coarse material having at least one open end 20 for manoeuvring onto the tip of a wind turbine blade 5. In the example shown in FIG. 1, the preventer 10 has a sleeve 30 which has the approximate shape of a stocking or pocket, the distal end 32 of which is closed or closed sufficiently to prevent a wind turbine blade tip from protruding through it. Although, the sleeve 30 can be thought of as substantially tubular, in that its length dimension is larger than its width, it will be appreciated the sleeve 30 tapers towards its end 32 to fit more snugly around the smaller diameter of wind turbine blade tip. Further, it may also have a flattened cross-section to follow the flattened cross-section of the blade away from the root. Such a flattened cross-section may enhance compact stowage. The preventer can be seen to have a longitudinal extent corresponding to the elongate stocking shape and a peripheral extent corresponding to the more or less to a circumferential dimension of the stocking shape of the sleeve 30.

The sleeve 30 can comprise a single layer or more than one layer. In the example of FIG. 1 the sleeve 30 comprises two layers, a first, external layer 38 and a second internal layer 37. In all cases, the exterior surface 34 of the sleeve 30 is such that the preventer 10 as a whole will disrupt laminar or smooth airflow over or around it. And in all cases, the sleeve 30 presents an interior surface 35 which is smooth. The smooth interior surface 35 may extend about the whole interior surface of the sleeve 30 or only a portion of it. In particular, the smooth interior surface 35 may extend over a portion of the peripheral extent of the sleeve 30 or over the full extent of the internal periphery of the sleeve 30. In any case, the smooth interior surface 35 preferably extends over substantially the whole longitudinal extent of the interior of the sleeve 30. This will ensure that the preventer 10 is capable of covering the tip portion of a wind turbine blade 5 without the exterior surface contacting a trailing edge thereof or the tips of any trailing edge serrations 7. The construction of the preventer 10 ensures that its smooth internal surface 35 covers trailing edge serrations of a blade 5 thereby shielding the serrations without them contacting the exterior surface 34. In the case illustrated in FIG. 1, the exterior surface 34 constitutes a first outer layer 38 while the smooth internal surface 35 is comprised of a second inner layer 37 or lining layer. The lining layer 37 shown in FIG. 1 extends about substantially the full longitudinal extent of the sleeve 30 and about a portion of the peripheral extent of the sleeve 30. In particular, the smooth internal surface 35 shown in FIG. 1 has the general shape of a tongue 26 which is long enough and broad enough to cover a line of serrations 7 on a blade trailing edge without the tips of these coming into contact with the rough exterior surface 34. In general, the tongue-shaped smooth surface may have a length and a width, wherein the width extends around a peripheral extent of the sleeve covering an arc of the sleeve amounting to at least one tenth of the sleeve circumference, preferably at least one fifth of the sleeve circumference. The length of said tongue 26 may extend along substantially the full length of the sleeve 30 or at least along two-thirds the length of the sleeve 30.

Also visible in FIG. 1 is a distal end of a first line 16 which may be a guide line and which may serve to retain the preventer 10 when it is in place on a blade 5, for example by fastening a proximal end to a part of the wind turbine 1 such as its hub 6 or rotor 4 or nacelle 3. The first guide line 16 may also be used during application of the preventer to a blade 5 by pulling the aperture 20 over the blade tip. The first guide line 16 may be fixed or releasably fastened to the preventer aperture 20 by any suitable means such as a loop 23 which, in aspects of the invention, may be a releasable shackle such as a snap shackle. A second line 17 may also be attachable in a fixed or releasable manner to the preventer 10, preferably to a distal end 32 thereof. Again, the attachment means may be a loop 24 which may be a snap shackle 24. A release control line (not shown) may also run to the snap shackle. The second line 17 may be of assistance during the attachment of the preventer 10 over a blade tip for example by assisting in keeping the sleeve 30 taut during application thereof and also by assisting with guiding the orientation of the preventer 10 during its application. Controllability of the preventer 10 is greatly enhanced if, during application thereof, the second line 17 is pulled to some extent in a direction opposite to the direction of the first guide line 16. By pulling the second line 17 in a direction lateral to a blade axis, the preventer 10 may be guided as it is pulled on to the blade.

In aspects of the invention, the second line 17 may be a tripping line and may in particular be attached at least partly to the material of the smooth internal surface 35. In alternative embodiments, a second guide line may be provided additional to a tripping line or a tripping line may be provided additional to a second guide line. The tripping line may ensure that if it is pulled somewhat when the preventer 10 is in pace on a blade 5, then there will be a tendency for the internal surface material 35, to which the tripping line is attached or attachable, to become taut, to straighten or flatten, and to release itself from underlying serration tips.

Figure 2:
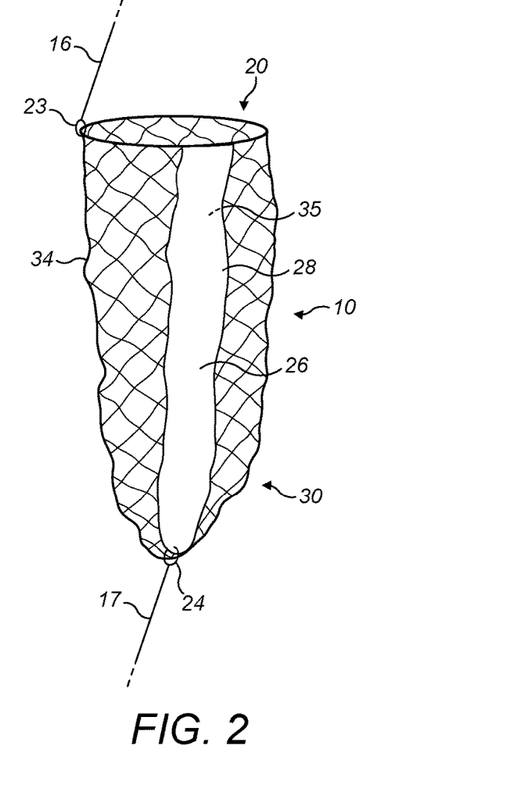
FIG. 2 shows an orthogonal view of an example of an oscillation preventer for a wind turbine blade according to additional aspects of the invention.

In FIG. 2, there is shown an alternative embodiment according to which the sleeve 30 of the preventer 10 may be formed from a single layer incorporating a non-aerodynamic exterior surface material 34 which may extend over the full longitudinal extent of the preventer 10 and about a majority of its peripheral extent. The sleeve 30 may additionally comprise a smooth interior surface 35 in the form of a tongue-shaped insert 28 which extends about a segment of the peripheral extent of the sleeve 30 and which may extend along substantially the whole longitudinal extent of the preventer sleeve 30, i.e. from its aperture region 20 to its distal end 32.

A second guide line 17 connected to the distal end of the preventer 10 may preferably be attached directly or indirectly to a distal end of the smooth interior surface material 35. This may ensure that the line 17 may have a dual functionality as a guide line and also as a tripping line for the smooth interior surface material 35 for enhanced removal of the preventer 10 from a blade 5. Preferably, the smooth internal surface material 35 and the exterior material 34 both extend from the aperture 20 of the preventer 10 and sleeve 30.

Figure 3:
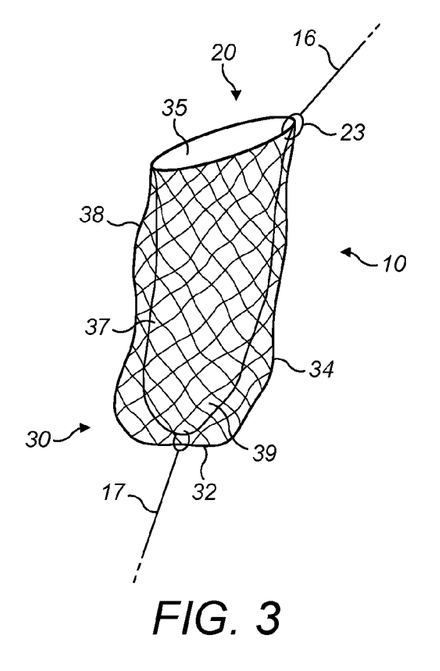
FIG. 3 shows an orthogonal view of an example of an oscillation preventer for a wind turbine blade according to alternative aspects of the invention.

A still further optional embodiment is illustrated at FIG. 3, in which the sleeve comprises a first outer layer 38 and a second inner layer 37 in the form of a lining. The lining layer 37 may in particular define the full interior surface of the sleeve 30, that is to say, the totality of that surface which, in use comes into contact with a blade and any serrations 7 at the blade 5. Also illustrated is a first guide line 16 releasably connected to the aperture 20 of the preventer 10 and a second line 17 releasably connected to a distal end 32 of the preventer. The second guide line 17 may be fixedly or releasably connected to the outer layer 38 or to both the inner layer 37 and the outer layer 38. An advantage of connecting the second line 17 to both the second, inner layer 37 and the first, outer layer 38 arises in that a pulling action on the line 17 may serve both to assist in the controllability of the preventer 10 during application or removal from a blade 5 and it may assist in releasing the smooth inner surface 35 from any engagement with e.g. serrations on a blade 5 after it has been in position perhaps for some time. I.e. the second line 17 may perform the function of a guide line 17 for the distal end of the preventer 10 and also the function of a tripping line.

Figure 4:
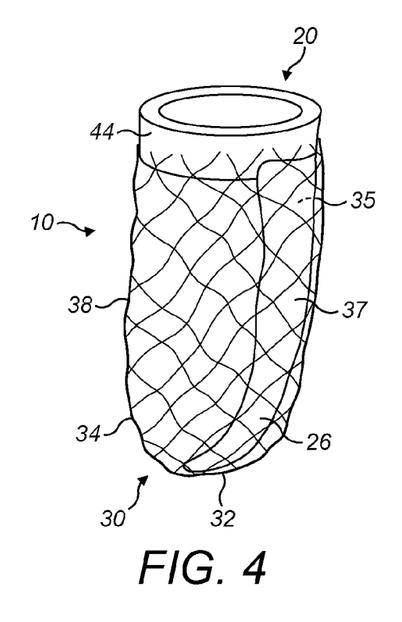
FIG. 4 shows an orthogonal view of an example of an oscillation preventer for a wind turbine blade according to yet further aspects of the invention.
Figure 5:
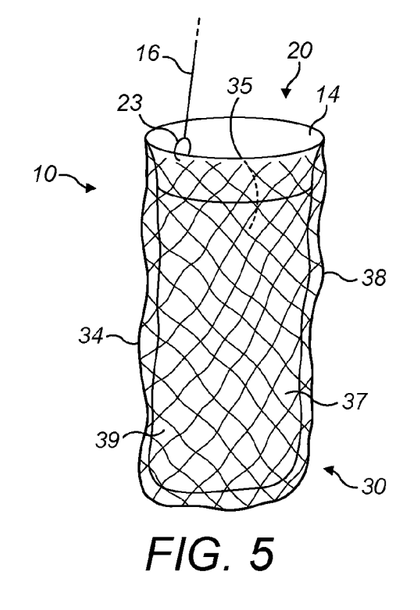
FIG. 5 shows an orthogonal view of an example of an oscillation preventer for a wind turbine blade according to still additional aspects of the invention.
Figure 6A:
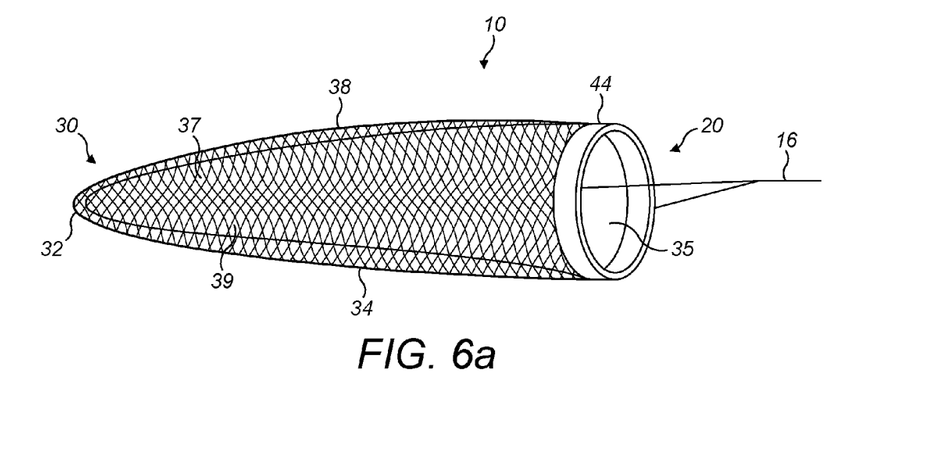
FIGS. 6a-c show a figurative and schematic impression of an oscillation preventer according to aspects of the invention illustrating figuratively its application over a blade tip provided with trailing edge serrations.
Figure 6B:
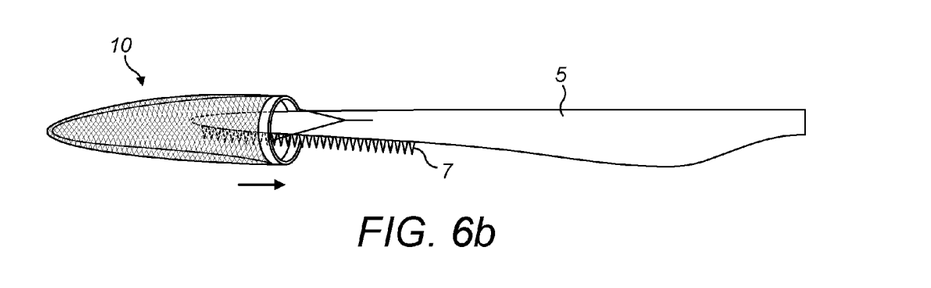
Figure 6C:
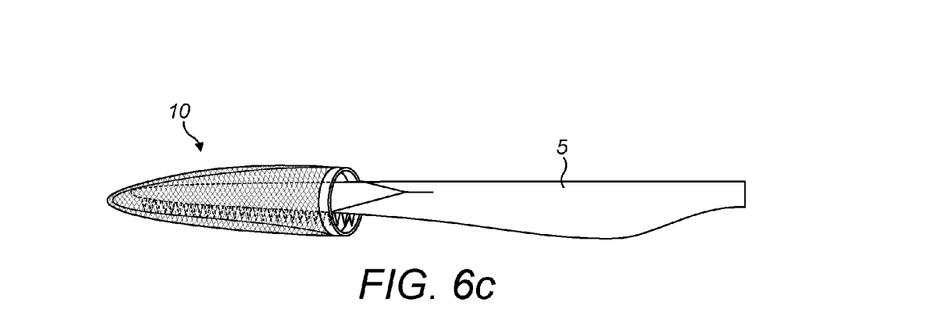

FIGS. 4 and 5 illustrate embodiments in which a collar 44 is provided at an aperture 20 of a preventer of the present invention. The provision of a collar 44 can add a certain amount of additional resilience to the preventer 10 especially at its aperture 20. It can thereby provide enhanced controllability of the preventer during attachment or removal thereof from a blade 5. The collar 44 illustrated in FIG. 4 or 5 may be made of a foam material such that it is both flexible and reasonably stiff. Alternatively, it may be inflatable. Any collar 44 according to the invention may preferably be ring shaped such as elliptical or generally round. An inflatable collar 44 may provide the added advantage that the preventer 10 is made more readily collapsible for transportation to a wind turbine site. In FIG. 5, there is shown a collar which is made of a solid material. The collar 44 may be funnel shaped or frustoconical, as illustrated in FIG. 5. A connection ring 23 or other element for connecting a line 16 to a preventer may advantageously be connectable or connected to a portion of the collar 44. The guide line 16 connections in FIGS. 1-3 may be connected analogously to a collar 44 positioned at an aperture 20 of the illustrated preventer 10 embodiments.

Although not shown in FIG. 5, a second guide line 17 which may also be a tripping line may be attached thereto, preferably although not exclusively as illustrated in FIG. 3. The embodiment illustrated in FIG. 4 may have a first guide line 16 connected as shown in FIG. 5 and may also optionally comprise a second line 17 attached thereto preferably as shown for example in FIG. 1. In aspects of the invention which are not illustrated, a tripping line connected to the distal end 32 of the smooth interior surface material 35 may be additional to a second guide line 17. In one aspect, a connecting loop similar to a connecting loop 24 shown in FIG. 2 may be attached to an outer layer of a 38 sleeve 30 and may serve as an attachment for a second guide line 17 which may be attached at one end to the loop 25 or fastener or which may be passed through the fastener or loop 24 to return for example to an operator, thereby potentially providing two ends of the second guide line 17 on which to pull for the purpose of guiding a preventer 10 into position.

In aspects of the invention, a collar 44 may take the form of a wire hoop. Such a wire hoop may for example be positioned at the very rim of an aperture 20 of the preventer 10 and may be compatible with embodiments illustrated in FIGS. 1-3.

Advantageously, both a second, lining layer 37 and a first, outer layer 38 may extend in a longitudinal direction of the preventer 10 from the collar 44 towards a distal end 32 thereof. That is to say, the elements of the sleeve 30 comprised of an exterior non-aerodynamic surface material 34 and an interior smooth material 35 may extend from a more or less rigid or resilient collar 44. This arrangement can provide additional stability to the preventer, especially during attachment and removal thereof from a blade 5.

In aspects of the invention, the material making up the outer surface 34 of the sleeve 30 may be any material that can be formed into the stocking shape mentioned above, but that will not be too coarse to damage the surface of the wind turbine blade 5 as the preventer 10 is attached. Fibre materials that are soft and flexible are therefore advantageous, such as but not limited to organic fibres like hemp, sisal, jute, and cotton; synthetic or artificial fibres such as polyamide, polypropylene, polyethylene or any suitable thermoplastic fibrous material; and monofilament materials, such as polyethylene or rubber. In the examples described here, the weave or mesh size of the netting is in the range 10×10 mm to 100×100 mm in mask. Depending on the application, it could also have a finer or a more open mesh.

An example of a method according to aspects of the invention will now be described in more detail with reference to FIGS. 6*a-c* and FIGS. 8 and 9 of the drawings.

The example oscillation preventer 10 comprises a sleeve 30 that is fitted over the tip of a wind turbine blade 5 when the blade is in a stationary position. Attachment of the sleeve 10 can be carried out in situ when the wind turbine blades 5 of an operational wind turbine 1 have been locked in position for maintenance or repair. Alternatively, the preventer 10 can be attached to a blade 5 in the factory, prior to installation of a rotor 4 on a wind turbine tower 2, and before the wind turbine 1 is connected to the grid to output electricity. In both cases, therefore, the wind turbine can be thought of as being in a non-operational mode. Once the preventer 10 is in place, the blade can be unlocked and can idle in a feathered position, if desired.

The preventer 10 can be secured over the end of the wind turbine blade 5 during the manufacturing process or attached using ropes or pulleys to the root of the blade 5 when the blade is attached to the hub 6 on a nacelle 3 and tower 2. Alternatively, a key advantage with the preventer 10, described above, is that it can be secured over the end of the wind turbine blades of a rotor 4 by service engineers, when the turbine is put into a non-operational mode and the blades are locked down for repair or maintenance.

Figure 8:
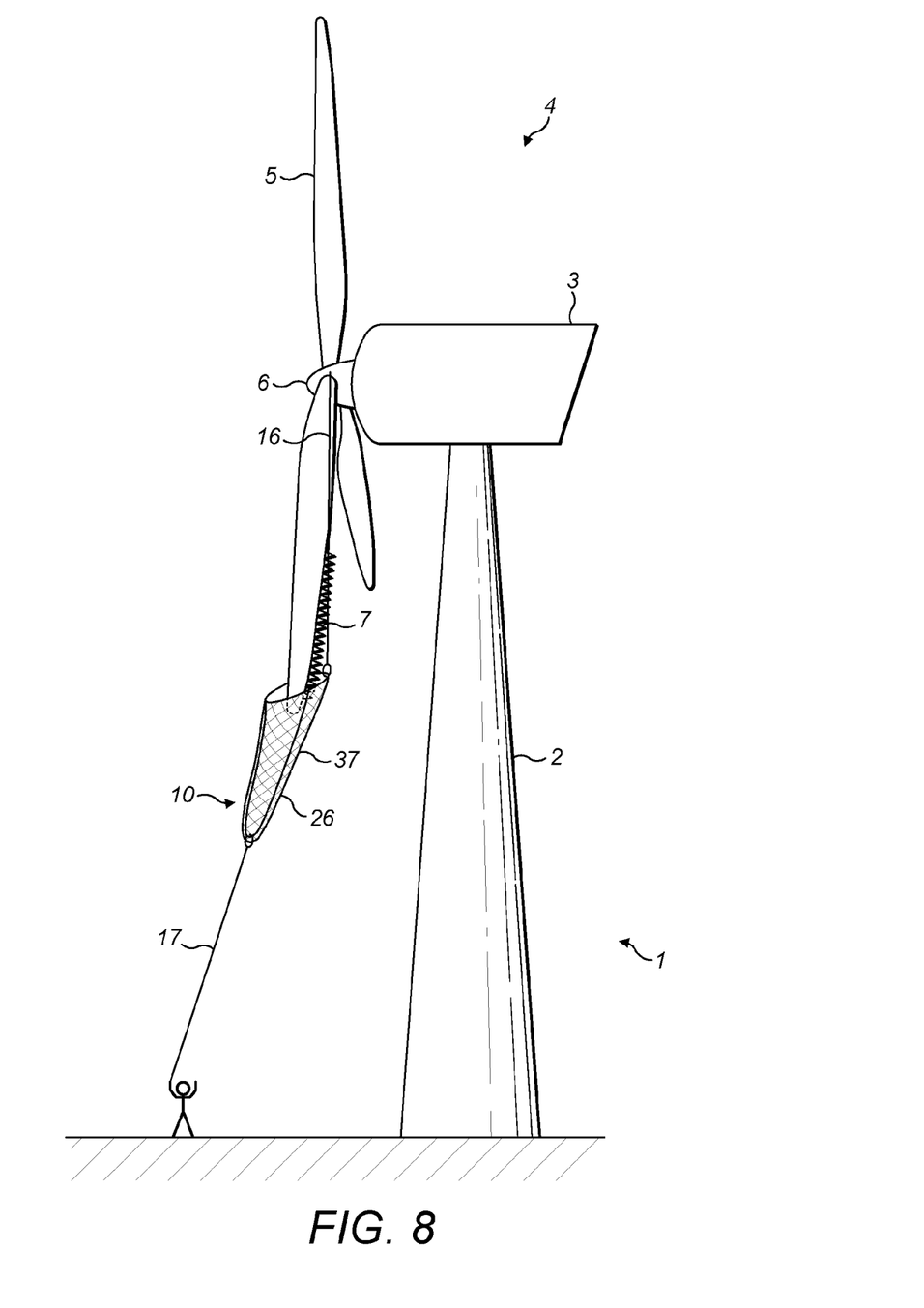
FIG. 8 shows a schematic illustration of a technique for attaching the anti-oscillation apparatus according to aspects of the invention to a blade of a wind turbine.
Figure 9:
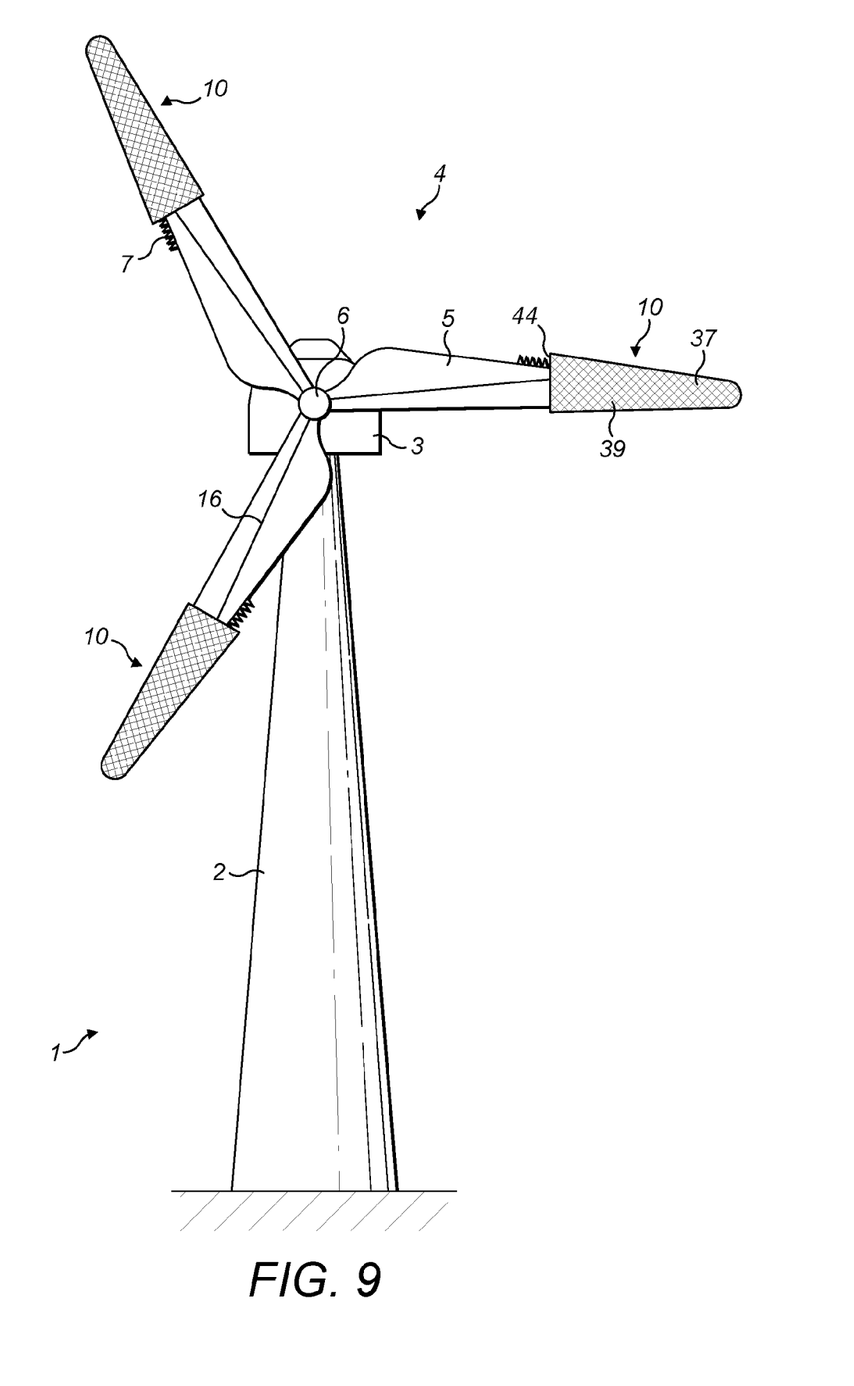
FIG. 9 shows a schematic illustration of a wind turbine including an anti-oscillation apparatus according to aspects of the invention, fitted to the wind turbine blades.

The process of securing the oscillation preventer 10 over the blades of a wind turbine is shown in FIG. 8 to which reference should now be made. First, the blades 5 are rotated into a position where one of the blades points towards the ground—corresponding to a so/called "Y-position" of a rotor- and the wind turbine 1 is stopped. For safety, the wind turbine blades 5 may be locked in this position, at least temporarily, in order, for example, to allow service engineers to carry out work such as maintenance on the wind turbine 1, e.g. at the nacelle 3 with the turbine power systems shut down.

A service engineer in the hub 6 of the rotor 4 may let down a distal end of a pull guide rope 16 from a position in the nacelle 3 or the hub 6 of the wind turbine 1. Optionally the other, proximal, end may be secured to the wind turbine body. A service engineer at the ground may secure the guide rope 16 to the preventer aperture 20 for example at a loop 23 secured thereto or at a loop 23 secured to a collar 44. A second guide line 17 may also be attached to a distal end 32 of the preventer 10, for example, by means of an attachment such as a loop 24. The service engineer in the hub 6 or nacelle 3 may then apply a force to the guide rope 16 by pulling on it, while the service engineer on the ground may hold a distal end of line 17. The service engineer in the hub 6 or the nacelle 3 can then pull further on the pull guide rope 16 to pull the open end of the sleeve 10 towards the tip of the wind turbine blade 5, ensuring that the smooth interior surface 34, be it a full lining such as a sock 39 or a partial lining in the form of a tongue 26, or even in the form of an insert 28, is oriented in such a way that the serrations 7 will be covered by that smooth interior surface 35 of the preventer 10. One advantage of the preventer 10 comprising a smooth interior surface in the form of a sock type full lining is that there is no additional requirement to align the smooth interior surface with the blade serrations 7. As shown in FIG. 8, the resilient collar 44 keeps the proximal end of the preventer 10 open allowing it, with some care and attention, to be threaded over the tip of the blade 5 and over the serrations 7. The ground engineer, having a better view point of the blade tip, which for obvious reasons is preferably directed towards the ground for this procedure, is crucial in using the second guide line 17 to guide the proximal and distal ends 32 of the preventer 10 into place. Once the preventer 10 has been threaded over the blade 5, a service engineer in the nacelle 3 or hub 6 can pull further on the pull guide rope 16 sliding the collar 44 upwards and along the length of the blade 5 until it can slide no further.

Once the preventer 10 is in place, a service engineer in the nacelle 3 or hub 6 may secure the proximal end of the pull guide rope 16 to a suitable location on the wind turbine structure (a dedicated tie-off point can be provided for this purpose if required, though one is not strictly necessary). The hub 6 or blade root may be preferred for the tie-off point however, as it allows the tie-off points to rotate with the wind turbine blades. The service engineer at the ground may then release the ground line 17 from the distal end of the preventer for example by actuating a release means from a loop 24. Alternatively, the line 17 may remain in place to be made off at a location on the turbine where it is secured and from where it may be retrieved for a preventer removal operation. The preventer 10 is then in place. To attach the sleeve 10 to the other blades 5 of the wind turbine, the blades are manoeuvred to face towards the ground, and the process described above is repeated. Once a preventer is attached to each blade, the wind turbine blades 5 can be locked in place.

The preventer can be detached from the wind turbine 1 for example simply by releasing the attached guide line 17 which may be connected as a tripping line, from an attachment position and pulling on it to straighten the sleeve 34 and in particular the smooth interior surface 35 such that it frees itself from the serrations 7. The second guide line 17 may thus also function as a tripping line. In alternatives, there may be provided both a guide line 17 for positioning or controlling the distal end 32 of the preventer and an additional tripping line connected to a distal part of the smooth interior surface 35.

The preventer 10, once in place on wind turbine blade 5, then prevents vortex shedding induced oscillation of the wind turbine blade, by deliberately causing turbulent air flow at the blade surface and preventing the air flow from adhering to the blade. In may readily be appreciated that a preventer 10 as described will cause turbulence and prevent or significantly reduce the magnitude of any vortex shedding that occurs.

For this reason, the material for the non-aerodynamic exterior surface is preferably a net-like material, as this has been found to be effective in causing turbulence at the blade surface and in reducing vortex shedding, by efficiently covering the leading edge of the blade. The open mesh or weave of the net ensures an irregular surface air boundary between the air and the blade, and is advantageously used as the sleeve 10 as it is easy to produce, and therefore not costly. Moreover, a net-like material can be collapsed or folded and stowed compactly when not in use. In addition, the use of a net-like material for an outer layer, which may be a first outer layer 38 of the sleeve 30, may allow easier attachment of a tripping line from outside the preventer to an inside lining layer 37 in the sleeve. In particular, a tripping line or second guide line 17 may pass through an aperture in the net-like material of a first outer layer 38. The mesh or weave of the net can for example leave open spaces in the netting having dimensions of around 25 mm to 100 mm, in at least one dimension or square, with a preferable dimension of 50 mm. If the net is too open of course the disruption to the laminar flow of air around the blade will not be reduced significantly for the net to have the desired effect. Additionally, it has been found desirable if the diameter of the cord from which the net is fashioned be in the range 1 mm to 5 mm, with a typical value in use being 2 mm to 3 mm. The net cording can have greater diameter, but then the weight of the net needs to be carefully assessed.

It is not strictly necessary to use a net-like material however as the outer sleeve material for the oscillation preventer 10, and it will be appreciated from the description that any material could be used that has a coarse external surface, either due to the weave of the material or due to the presence of protrusions, indentations specifically engineered into its surface. The temporary surface section could for example be engineered to resemble plastic or foam packaging sheets or filler material. A height 5 to 10 mm for example in the depth of the protrusions or indentations of any surface shape has been found more than sufficient to cause a severe disruption to the laminar flow. Any material may be used for the non-aerodynamic exterior surface which is effective to induce turbulence in air flowing over it. Suitable non-aerodynamic exterior surfaces may have a bumpy, lumpy or highly textured surface or a surface which exhibits multiple protrusions or raised portions whether regular or irregular. In particular, surface irregularities may extend across substantially all the surface or a significant portion thereof and the effect of the textured surface is the interruption of smooth or laminar airflow across all or a substantial part of it.

The invention claimed is:

1. A wind turbine blade oscillation preventer comprising an aperture and a sleeve and having a peripheral extent and a longitudinal extent,
    said preventer being configured for removable application over a wind turbine blade and configured to extend longitudinally thereover and peripherally thereabout;
    said preventer having a non-aerodynamic exterior surface which exhibits a rough surface capable of disrupting smooth or laminar airflow over a substantial portion of said longitudinal and peripheral extent of said sleeve when said preventer is in place on the wind turbine blade;
    and wherein said preventer further comprises a smooth interior surface extending along a substantial portion of said longitudinal extent of said sleeve and wherein said preventer comprises a resilient collar at said aperture portion.

2. The preventer of claim 1, wherein said smooth interior surface is formed from an abrasion resistant, low-friction material.

3. The preventer of claim 1, wherein said smooth interior surface extends from an aperture region of said sleeve and internally within said sleeve.

4. The preventer of claim 1, wherein said non-aerodynamic exterior surface is an external surface of a first, outer layer of said sleeve; said smooth interior surface is an internal surface of a second, inner layer of said sleeve.

5. The preventer of claim 4, wherein respective said first and said second layers extend from an aperture region of said preventer.

6. The preventer of claim 4, wherein said first and said second layers include separate and distinct layered materials.

7. The preventer of claim 1 wherein said smooth interior surface is provided in the form of a liner inside said sleeve and extending from an aperture region thereof.

8. The preventer of claim 7 wherein said liner extends inside substantially the full longitudinal and peripheral extent of said preventer.

9. The preventer of claim 1 wherein said exterior surface extends over substantially the full longitudinal extent of said sleeve and around a majority of said peripheral extent of said sleeve.

10. The preventer of claim 1 wherein said collar is generally circular or elliptical.

11. The preventer of claim 1 further comprising a guide line extending from said aperture region.

12. The preventer of claim 1 further comprising a tripping line extending from a distal portion of said smooth interior surface.

13. A method of operating a wind turbine to inhibit oscillations induced by the air flow across at least one of a plurality of blades of the wind turbine when the wind turbine is in a non-operational mode, said wind turbine comprising a blade rotor including the plurality of blades, the blade rotor being rotatably mounted via a hub thereof to a nacelle positioned atop a tower, said at least one blade exhibiting trailing edge serrations; said method comprising:
    releasably locking the plurality of wind turbine blades of said rotor in place;
    applying and releasably securing a preventer according to claim 1 to said at least one wind turbine blade so that said preventer covers a region of the blade surface and provides a non-aerodynamic outer surface capable of inducing turbulence in air flow across said at least one blade;
    said method including disposing said smooth interior surface of said preventer sleeve over and about said serrated trailing edge of said at least one blade during application of said preventer.

14. The method according to claim 13, further comprising:
    attaching a first guide line to an attachment point on said preventer adjacent said aperture;
    pulling said sleeve onto said at least one wind turbine blade using said guide line;
    tying said guide line to a part of said wind turbine to secure said sleeve in place.

15. The method according to claim 14, further including attaching a second line to a distal end of said preventer, so that pulling on said first and second lines pulls the length of said sleeve taut.

16. The method according to claim 15 further including pulling said second line in order to free said smooth interior surface from said serrations prior to removal of said preventer.

* * * * *